(12) United States Patent
Lee et al.

(10) Patent No.: US 11,904,844 B2
(45) Date of Patent: Feb. 20, 2024

(54) SYSTEM AND METHOD FOR CONTROLLING TRAVEL OF VEHICLE

(71) Applicants: Hyundai Motor Company, Seoul (KR); Kia Corporation, Seoul (KR)

(72) Inventors: Sang Hyu Lee, Incheon (KR); Ki Boem Lee, Hwaseong-si (KR); Joo Han Nam, Hwaseong-si (KR); Jong Su Lim, Hwaseong-si (KR); Hyun Jae Bang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 237 days.

(21) Appl. No.: 17/459,521

(22) Filed: Aug. 27, 2021

(65) Prior Publication Data

US 2022/0105924 A1 Apr. 7, 2022

(30) Foreign Application Priority Data

Oct. 5, 2020 (KR) .................. 10-2020-0128302

(51) Int. Cl.
*B60W 30/06* (2006.01)
*B60W 50/029* (2012.01)
*B60W 50/02* (2012.01)
*G08G 1/14* (2006.01)
*B60W 50/00* (2006.01)

(52) U.S. Cl.
CPC ........ *B60W 30/06* (2013.01); *B60W 50/0205* (2013.01); *B60W 50/029* (2013.01); *G08G 1/14* (2013.01); *B60W 2050/0052* (2013.01); *B60W 2050/021* (2013.01); *B60W 2050/022* (2013.01);
(Continued)

(58) Field of Classification Search
CPC ............ B60W 30/06; B60W 50/0205; B60W 50/029; B60W 2050/0052; B60W 2050/021; B60W 2050/0215; B60W 2050/022; B60W 2300/14; B60W 2556/50; B60W 60/0059; B60W 2556/45; B60W 30/02; B60W 10/18; B60W 10/20; B60W 40/10; B60W 50/0097; B60W 2300/145; B60W 2420/00; G08G 1/14; G08G 1/096838; G08G 1/09685; G08G 1/143;
(Continued)

(56) References Cited

U.S. PATENT DOCUMENTS

| 10,684,625 | B2 | 6/2020 | Miller et al. |
| 2019/0064837 | A1 | 2/2019 | Miller et al. |
| 2020/0398803 | A1* | 12/2020 | Oba ............... B60T 8/1708 |

FOREIGN PATENT DOCUMENTS

| CN | 109598969 A | * | 4/2019 | ........... G08G 1/0175 |
| KR | 10-2020-0046034 A | | 5/2020 | |
| KR | 10-2109120 B1 | | 5/2020 | |

* cited by examiner

*Primary Examiner* — Daryl C Pope
(74) *Attorney, Agent, or Firm* — MORGAN, LEWIS & BOCKIUS LLP (57) ABSTRACT

A system for controlling travel of a vehicle includes a server configured to create a target parking location, and the vehicle configured to acquire state information of an actuator from a sensor, determine whether a behavior of the actuator is in a normal state based on the state information of the actuator, determine whether the vehicle is able to travel to the target parking location when it is determined that the behavior of the actuator is in an abnormal state, and request the server for a new target parking location when it is determined that the vehicle is not able to travel to the target parking location.

15 Claims, 12 Drawing Sheets

100

(52) U.S. Cl.
CPC . *B60W 2050/0215* (2013.01); *B60W 2300/14* (2013.01); *B60W 2556/50* (2020.02)

(58) Field of Classification Search
CPC .. G08G 1/148; G08G 1/096827; G08G 1/142; G08G 1/168; B60Y 2400/30
See application file for complete search history.

SYSTEM AND METHOD FOR CONTROLLING TRAVEL OF VEHICLE

CROSS-REFERENCE TO RELATED APPLICATION

This application claims the benefit of priority to Korean Patent Application No. 10-2020-0128302, filed on Oct. 5, 2020, the entire contents of which are incorporated herein by reference.

TECHNICAL FIELD

The present disclosure relates to a system and a method for controlling travel of a vehicle.

BACKGROUND

Recently, development of a vehicle parking assist system that assists parking of a vehicle is in progress to improve convenience of a driver. The vehicle parking assistance system provides a parking assistance service by selecting a parking place based on information on a surrounding environment of the vehicle or analyzing a parking tendency of the driver. Because such parking assistance service is generally provided based on the information on the surrounding environment of the vehicle without reflecting a state of the vehicle, there is a limitation in that it is difficult to park the vehicle in a parking assistance service scheme provided by the existing vehicle parking assistance system. In particular, in a case of a vehicle to which a trailer is connected, because a turning radius and a bending angle of the trailer that are changed based on the state of the vehicle must be considered, there is a limitation in that it is difficult to assist the parking only with the surrounding environment information.

SUMMARY

An aspect of the present disclosure provides a system and a method for controlling travel of a vehicle that support parking of the vehicle to which a trailer is connected.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for controlling travel of a vehicle includes a server that creates a target parking location, and the vehicle that acquires state information of an actuator from a sensor, determines whether a behavior of the actuator is in a normal state based on the state information of the actuator, determines whether the vehicle is able to travel to the target parking location received from the server when the behavior of the actuator is in an abnormal state, and requests the server for a new target parking location when the vehicle is not able to travel to the target parking location.

In one implementation, the vehicle may acquire at least one of state information of a steering actuator, state information of a braking actuator, state information of a driving actuator, and/or state information of an actuator of a trailer connected to the vehicle from the sensor.

In one implementation, the vehicle may determine whether the actuator behaves in response to a control command of the vehicle for a predetermined time based on the state information of the actuator, and determine whether the behavior of the actuator is in the normal state based on the determination result.

In one implementation, the vehicle may predict the state information of the actuator based on a Kalman filter or a pre-learned result, and compare the predicted state information of the actuator with the state information of the actuator acquired from the sensor to determine whether the behavior is in the normal state.

In one implementation, the server may create the target parking location based on at least one of a maximum turning radius of the vehicle calculated based on the state information of the steering actuator of the vehicle, a travelable distance calculated based on the state information of the driving actuator or the state information of the braking actuator, and/or an available parking region determined based on the state information of the actuator of the trailer.

According to another aspect of the present disclosure, a system for controlling travel of a vehicle includes the vehicle that acquires state information of an actuator from a sensor, and a server that creates a target parking location of the vehicle, determines whether a behavior of the actuator is in a normal state based on the state information received from the vehicle, determines whether the vehicle is able to travel to the target parking location when the behavior of the actuator is in an abnormal state, and creates a new target parking location when the vehicle is not able to travel to the target parking location.

In one implementation, the server may receive at least one of state information of a steering actuator, state information of a braking actuator, state information of a driving actuator, and/or state information of an actuator of a trailer connected to the vehicle from the vehicle.

In one implementation, the server may determine whether the actuator behaves in response to a control command of the vehicle for a predetermined time based on the state information of the actuator, and determine whether the behavior of the actuator is in the normal state based on the determination result.

In one implementation, the server may predict the state information of the actuator based on a Kalman filter or a pre-learned result, and compare the predicted state information of the actuator with the state information of the actuator acquired from the sensor to determine whether the behavior is in the normal state.

In one implementation, the server may create the target parking location based on at least one of a maximum turning radius of the vehicle calculated based on the state information of the steering actuator of the vehicle, a travelable distance calculated based on the state information of the driving actuator or the state information of the braking actuator, and/or an available parking region determined based on the state information of the actuator of the trailer.

According to another aspect of the present disclosure, a method for controlling travel of a vehicle includes acquiring state information of an actuator from a sensor of the vehicle, determining whether a behavior of the actuator is in a normal state based on the state information of the actuator, receiving a target parking location from a server, and determining whether the vehicle is able to travel to the target parking location when the behavior of the actuator is in an abnormal state, and requesting the server for a new target parking location when the vehicle is not able to travel to the target parking location.

In one implementation, the acquiring of the state information of the actuator may include acquiring at least one of state information of a steering actuator, state information of a braking actuator, state information of a driving actuator, and/or state information of an actuator of a trailer connected to the vehicle from the sensor.

In one implementation, the determining of whether the behavior of the actuator is in the normal state may include determining whether the actuator behaves in response to a control command of the vehicle for a predetermined time based on the state information of the actuator, and determining whether the behavior of the actuator is in the normal state based on the determination result.

In one implementation, the determining of whether the behavior of the actuator is in the normal state may include predicting the state information of the actuator based on a Kalman filter or a pre-learned result, and comparing the predicted state information of the actuator with the state information of the actuator acquired from the sensor to determine whether the behavior is in the normal state.

In one implementation, the target parking location may be created, by the server, based on at least one of a maximum turning radius of the vehicle calculated based on the state information of the steering actuator of the vehicle, a travelable distance calculated based on the state information of the driving actuator or the state information of the braking actuator, and/or an available parking region determined based on the state information of the actuator of the trailer.

DRAWINGS

The above and other objects, features and advantages of the present disclosure will be more apparent from the following detailed description taken in conjunction with the accompanying drawings.

DETAILED DESCRIPTION

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
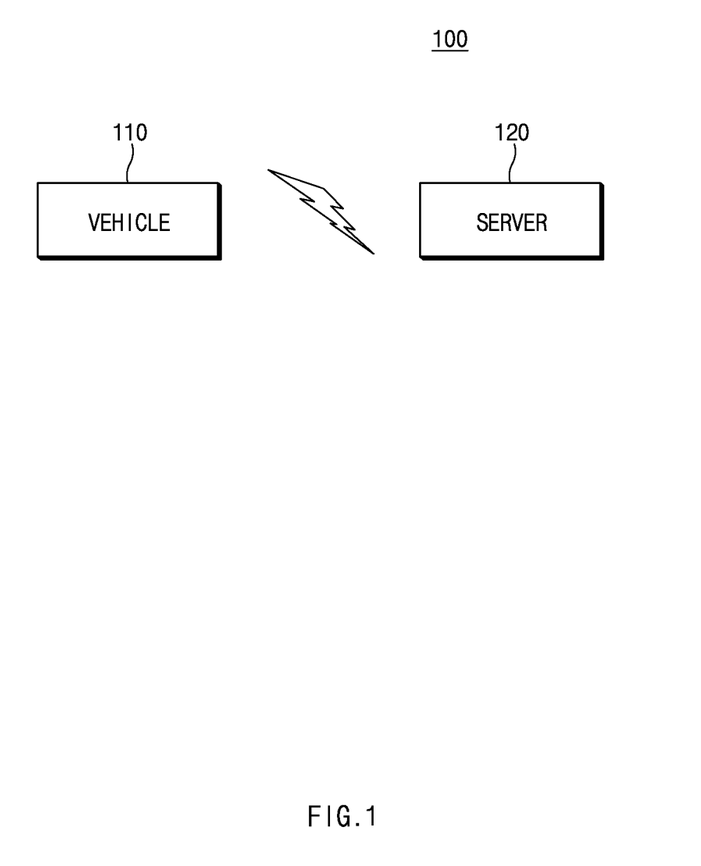
FIG. 1 is a view illustrating a configuration of a vehicle travel control system in one form of the present disclosure.

FIG. 1 is a view illustrating a configuration of a vehicle travel control system in some forms of the present disclosure.

As shown in FIG. 1, a vehicle travel control system 100 in some forms of the present disclosure may include a vehicle 110 and a server 120.

The vehicle 110 may acquire state information of the vehicle from a sensor. In this connection, the state information may include at least one of steering state information, braking state information, and/or driving state information, and the vehicle 110 may acquire state information of a trailer when being connected to the trailer. In this connection, the state information of the trailer may include at least one of steering and/or braking information of the trailer. A more specific operation of the vehicle 110 will be described with reference to FIG. 2.

In some forms of the present disclosure, the vehicle 110 may determine whether a behavior is in a normal state based on the state information acquired from the sensor, receive a target parking location from the server 120 when the behavior is in an abnormal state, and determine whether the vehicle 110 is able to travel to the target parking location. When it is determined that the vehicle 110 is not able to travel to the target parking location received from the server 120, the vehicle 110 may request the server 120 for a new target parking location.

The server 120 may create the target parking location of the vehicle. In some forms of the present disclosure, the server 120 may receive the state information from the vehicle and determine whether the behavior of the vehicle is in the normal state based on the state information of the vehicle. In addition, when the behavior of the vehicle is in the abnormal state, the server 120 may determine whether the vehicle is able to travel to the target parking location. When the vehicle is not able to travel to the target parking location, the server 120 may create the new target parking location. A more specific operation of the server 120 will be described with reference to FIG. 3.

Figure 2:
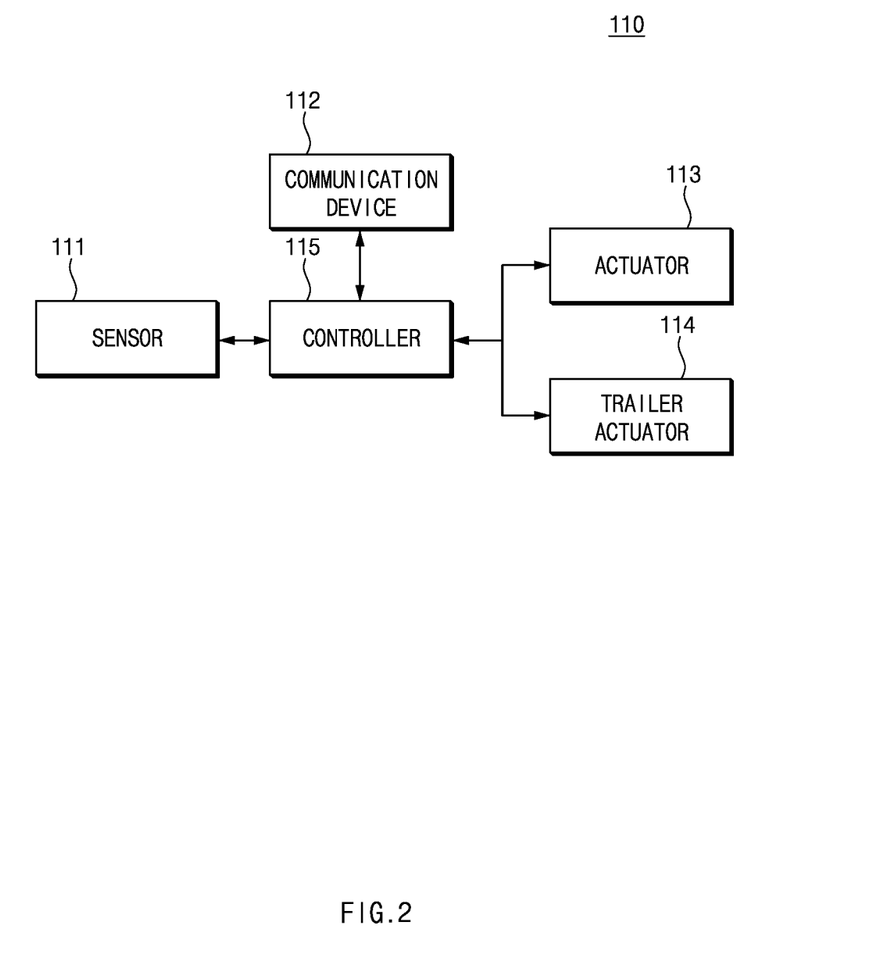
FIG. 2 is a view illustrating a configuration of a vehicle in one form of the present disclosure.

FIG. 2 is a view illustrating a configuration of a vehicle in some forms of the present disclosure.

As shown in FIG. 2, the vehicle 110 may include a sensor 111, a communication device 112, an actuator 113, a trailer actuator 114, and a controller 115.

The sensor 111 may acquire the state information of the vehicle. In some forms of the present disclosure, the sensor 111 may acquire a vehicle speed, a longitudinal acceleration, a lateral acceleration, a rotation angle between the vehicle and the trailer, a steering angle, a steering torque, and the like. For example, the sensor 111 may acquire information of a state operated by the actuator 113 in response to a control command of the controller 115. To this end, the sensor 111 may include a vehicle speed sensor, an acceleration sensor, a steering angle sensor, a distance sensor, an image sensor, an infrared sensor, a yaw rate sensor, and the like.

The communication device 112 may perform wireless communication with the server 120. In some forms of the present disclosure, the communication device 112 may communicate with the server 120 in various wireless communication schemes such as a Wi-Fi, a WiBro, a global system for mobile communication (GSM), a code division multiple access (CDMA), a wideband code division multiple access (WCDMA), a universal mobile telecommunication system (UMTS), a time division multiple access (TDMA), a long term evolution (LTE), and the like.

The actuator 113 may include a device that performs driving, braking, and steering operations of the vehicle in response to the control command of the controller 115. The actuator 113 may include a driving actuator, a braking actuator, and a steering actuator.

The trailer actuator 114 may include a device that performs a braking or steering operation of the trailer in response to the control command of the controller 115. The trailer actuator 114 may include a braking actuator and a steering actuator.

The controller 115 may be implemented by various processing devices, such as a microprocessor having a semiconductor chip or the like embedded therein capable of performing operation or execution of various commands, and may control the operation of the vehicle in some forms of the present disclosure. In some forms of the present disclosure, the controller 115 may determine whether the behavior of the vehicle is in the normal state based on the state information acquired from the sensor, determine whether the vehicle 110 is able to travel to the target parking location received from the server 120 when the behavior is in the abnormal state, and request the server for the new target parking location when the vehicle 110 is not able to travel to the target parking location.

In some forms of the present disclosure, the controller 115 may acquire at least one of state information of the steering actuator of the vehicle, state information of the braking actuator of the vehicle or the driving actuator of the vehicle, and/or state information of the trailer for a predetermined time or longer. The controller 115 may determine whether the steering actuator has behaved in response to the control command of the controller 115 based on the state information of the steering actuator acquired for the predetermined time. In addition, the controller 115 may determine whether the braking actuator or the driving actuator has behaved in response to the control command of the controller 115 based on the state information of the braking actuator or the state information of the driving actuator acquired for the predetermined time. In addition, the controller 115 may determine whether the trailer has behaved in response to the control command of the controller 115 based on the state information of the trailer acquired for the predetermined time.

In some forms of the present disclosure, the controller 115 may predict the state information of the actuator based on a Kalman filter or a pre-learned result, and compare the predicted state information of the actuator with the state information of the actuator acquired from the sensor to determine whether the behavior of the actuator is in the normal state.

When it is determined that the behavior of the actuator is in the normal state, the controller 115 receives the target parking location from the server 120 and create a travel path to the target parking location. In addition, the controller 115 may control the vehicle to travel along the travel path created to the target parking location.

In one example, when it is determined that the behavior of the actuator is not in the normal state (is in the abnormal state), the controller 115 may receive the target parking location from the server 120. The controller 115 may determine whether the vehicle 110 is able to travel to the target parking location received from the server 120. When it is determined that the vehicle 110 is able to travel to the target parking location received from the server 120, the controller 115 may create the travel path to the target parking location and control the vehicle to travel along the travel path. In one example, when it is determined that the vehicle 110 is not able to travel to the target parking location, the controller 115 may request the server 120 for the new target parking location to which the vehicle 110 is able to travel based on the abnormal behavior state of the actuator. When receiving the new target parking location from the server 120, the controller 115 may determine again whether the vehicle 110 is able to travel to the new target parking location.

Figure 3:
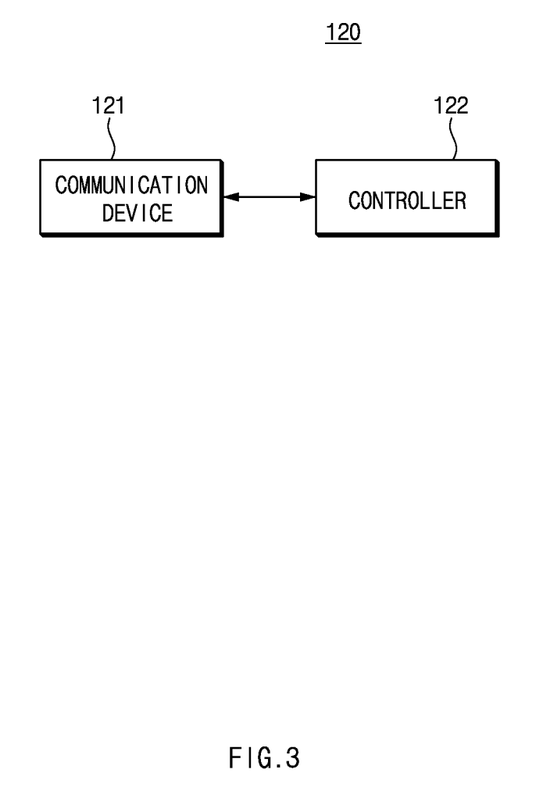
FIG. 3 is a view illustrating a configuration of a server in one form of the present disclosure.

FIG. 3 is a view illustrating a configuration of a server in some forms of the present disclosure.

As shown in FIG. 3, the server 120 may include a communication device 121 and a controller 122.

The communication device 121 may perform wireless communication with the vehicle 110. In some forms of the present disclosure, the communication device 121 may communicate with the vehicle 110 in various wireless communication schemes such as a Wi-Fi, a WiBro, a global system for mobile communication (GSM), a code division multiple access (CDMA), a wideband code division multiple access (WCDMA), a universal mobile telecommunication system (UMTS), a time division multiple access (TDMA), a long term evolution (LTE), and the like.

The controller 122 may be implemented by various processing devices, such as a microprocessor having a semiconductor chip or the like embedded therein capable of performing operation or execution of various commands, and may control the operation of the server in some forms of the present disclosure. In some forms of the present disclosure, the controller 122 may create the target parking location by determining an available parking region of the vehicle 110. In addition, the controller 122 may determine whether the behavior of the vehicle is in the normal state based on the state information acquired from the vehicle 110, determine whether the vehicle 110 is able to travel to the previously created target parking location when the behavior is in the abnormal state, and create the new target parking location when the vehicle 110 is not able to move to the target parking location.

Figure 4:
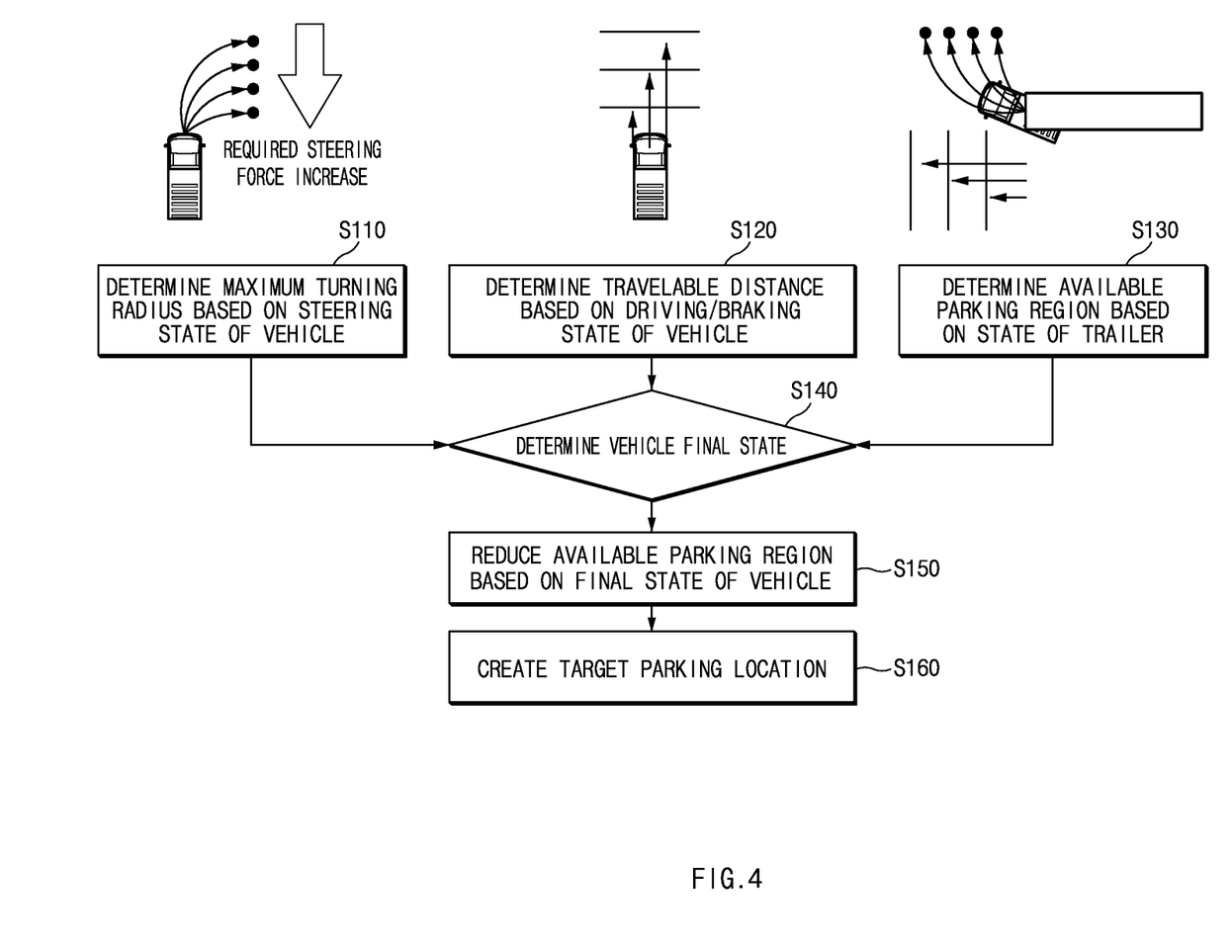
FIG. 4 is a view schematically illustrating a method for determining a target parking section in one form of the present disclosure.

The controller 122 may receive the state information of the steering actuator of the vehicle from the vehicle 110, and may determine a maximum turning radius of the vehicle based on the received state information of the steering actuator (S110). In addition, the controller 122 may receive the state information of the driving actuator and the braking actuator from the vehicle 110, and determine a travelable distance of the vehicle based on the received state information of the driving actuator and the braking actuator (S120). In addition, the controller 122 may receive the state information of the trailer actuator of the vehicle from the vehicle 110, and determine the available parking region based on the received state information of the trailer actuator (S130).

Figure 5A:
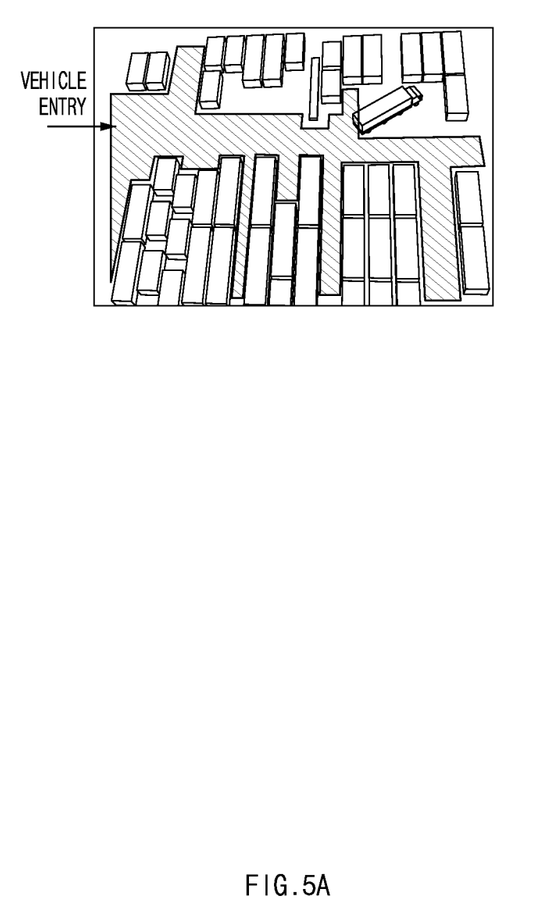
FIG. 5A is a view illustrating an available parking region determined in one form of the present disclosure.
Figure 5B:
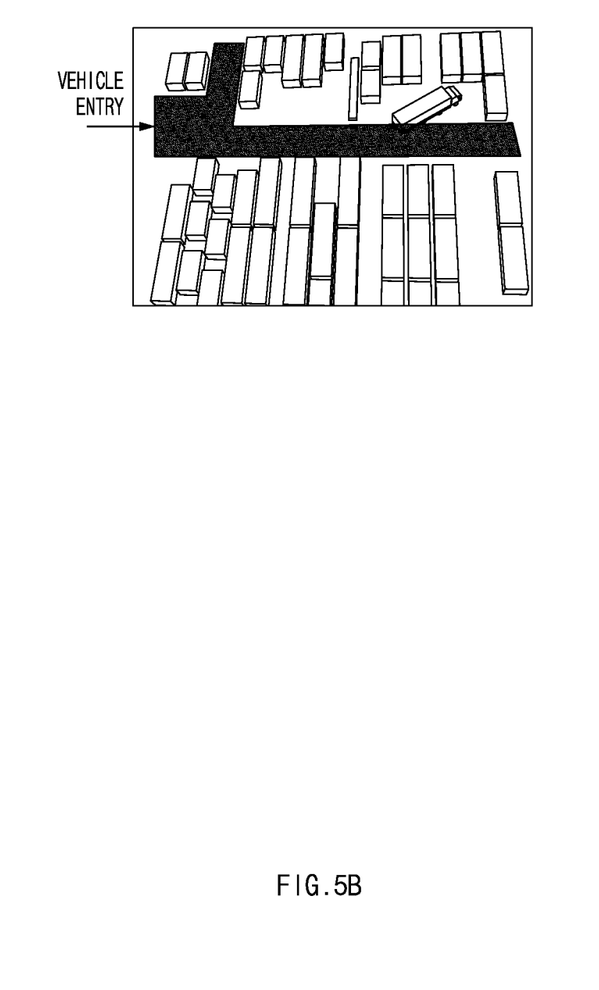
FIG. 5B is a view illustrating a target parking section determined in one form of the present disclosure.

The controller 122 may determine a vehicle final state based on at least one of the results determined in S110, S120, and S130 (S140), and reduce the available parking region based on the final state of the vehicle (S150). A more detailed description of S150 will be achieved with reference to FIG. 5.

FIG. 5A is a view illustrating an available parking region determined in some forms of the present disclosure, and FIG. 5B is a view illustrating a target parking section determined in some forms of the present disclosure.

As shown FIG. 5A, after determining the available parking region based on the state information of the trailer actuator received from the vehicle 110 (S130), when the vehicle final state is determined in S140 based on the at least one of the results determined in S110, S120, and S130, the controller 122 may create the target parking location by reducing the available parking region as shown in FIG. 5B based on the final state of the vehicle.

The controller 122 may compare the state information of the actuator received from the vehicle 110 to determine whether the behavior of the actuator is in the normal state.

When it is determined that the behavior of the actuator is in the normal state, the controller 122 creates the travel path to the previously created target parking location. In addition, the controller 122 may control the vehicle to travel along the travel path created to the target parking location.

In one example, when it is determined that the behavior of the actuator is not in the normal state (is in the abnormal state), the controller 122 may determine whether the vehicle is able to travel to the previously created target parking location. When it is determined that the vehicle is able to travel to the previously generated target parking location, the controller 122 may create the travel path to the target parking location and transmit the travel path to the vehicle. In one example, when it is determined that the vehicle 110 is not able to travel to the previously generated target parking location, the controller 122 may regenerate the new target parking location to which the vehicle 110 is able to travel based on the abnormal behavior state of the actuator. When regenerating the new target parking location, the controller 122 may redetermine whether the vehicle 110 is able to travel to the new target parking location.

Figure 6:
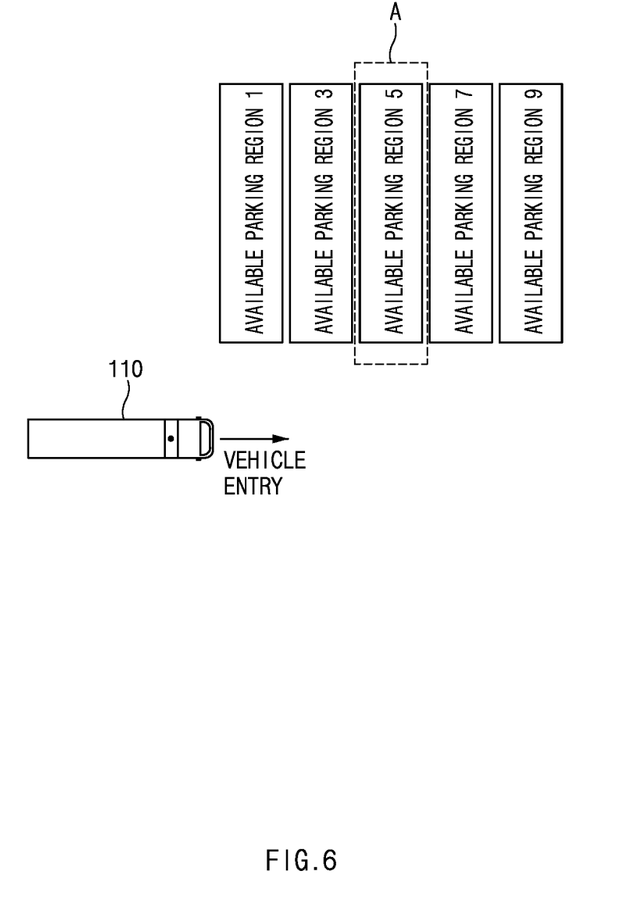
FIG. 6 is a view illustrating a target parking section determined in one form of the present disclosure.

FIG. 6 is a view illustrating a target parking section determined in some forms of the present disclosure.

As shown in FIG. 6, in some forms of the present disclosure, the server 120 may create the target parking location in FIG. 4. When the server 120 creates a target parking location (an available parking region 5), the vehicle 110 or the server 120 may determine whether the vehicle 110 is able to travel to the target parking location. In some forms of the present disclosure, the vehicle 110 may receive a target parking location "A" created by the server 120, create the travel path when it is determined that the vehicle is able to travel to the target parking location, and control the vehicle to travel along the travel path. In some forms of the present disclosure, the server 120 may create the travel path of the vehicle to the target parking location "A" created in advance, and transmit the travel path to the vehicle 110 when it is determined that the vehicle 110 is able to travel to the target parking location.

Figure 7:
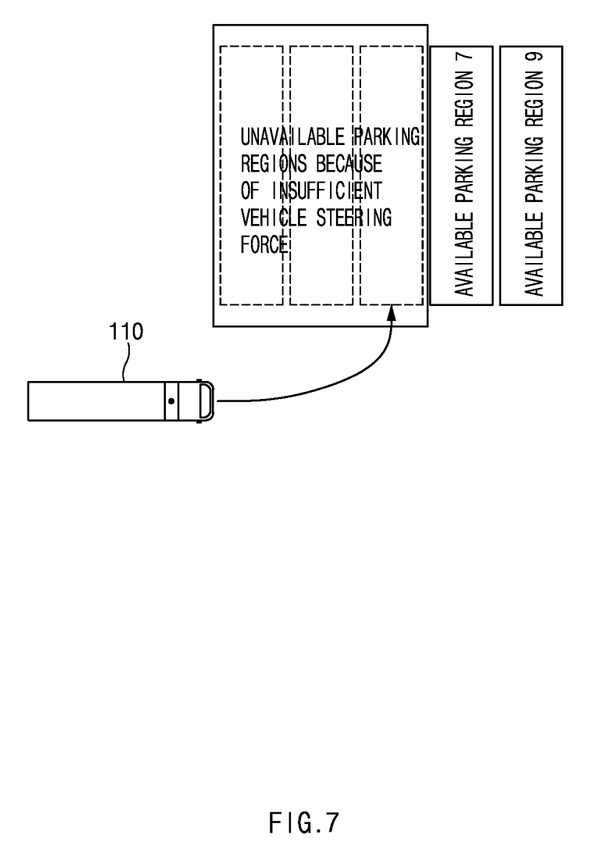
FIG. 7 is a view illustrating an unavailable parking section determined based on a vehicle state in one form of the present disclosure.
Figure 8:
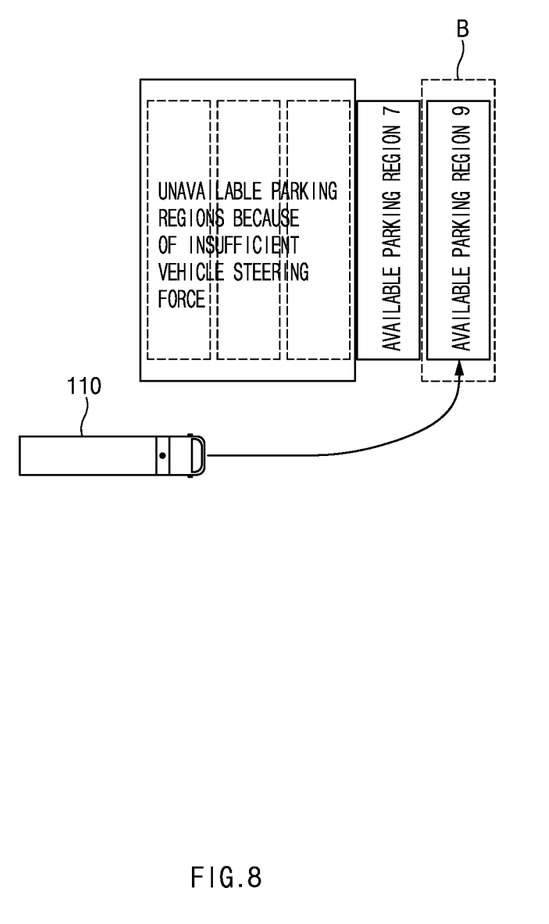
FIG. 8 is a view illustrating a new available parking section determined in one form of the present disclosure.

FIG. 7 is a view illustrating an unavailable parking section determined based on a vehicle state in some forms of the present disclosure, and FIG. 8 is a view illustrating a new available parking section determined in some forms of the present disclosure.

As shown in FIG. 7, when it is determined that the behavior of the actuator is in the abnormal state based on the state information of the actuator of the vehicle, the server 120 may set unavailable parking regions (available parking regions 1, 3, and 5) among the available parking regions. In addition, the server 120 may create a new target parking location "B" at which the parking is available based on the abnormal behavior state of the actuator.

Figure 9:
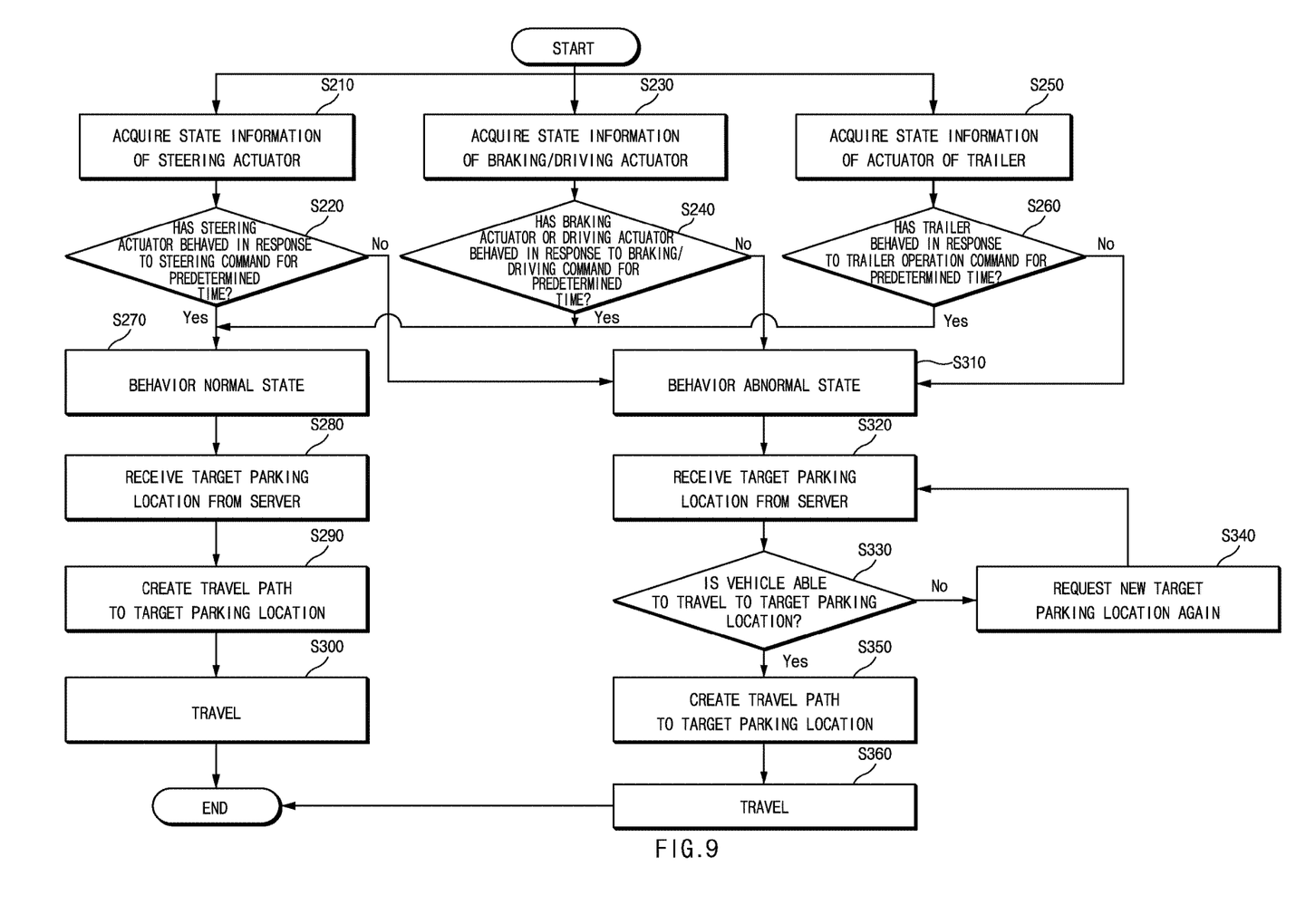
FIG. 9 is a flowchart illustrating a vehicle travel control method in one form of the present disclosure.

FIG. 9 is a flowchart illustrating a vehicle travel control method in some forms of the present disclosure.

As shown in FIG. 9, the vehicle 110 in some forms of the present disclosure may acquire the state information of the steering actuator (S210), and determine whether the steering actuator has behaved in response to a steering command for the predetermined time (S220). In addition, the vehicle 110 may acquire the state information of the braking actuator or the driving actuator (S230), and determine whether the braking actuator or the driving actuator has behaved in response to a braking command or a driving command for the predetermined time (S240). In addition, the vehicle 110 may acquire the state information of the actuator of the trailer (S250), and determine whether the trailer has behaved in response to the control command for the predetermined time (S260).

The vehicle 110 may determine whether the behavior of the actuator is in the normal state based on the state of the actuator acquired in S220, S240, and S260.

When it is determined that the behavior of the actuator is in the normal state (S270), the vehicle 110 receives the target parking location from the server 120 (S280), and may create the travel path to the target parking location (S290). In addition, the vehicle 110 may be controlled to travel to the target parking location along the travel path (S300).

In one example, when it is determined that the behavior of the actuator is in the abnormal state (S310), the vehicle 110 may receive the target parking location from the server 120 (S320), and determine whether the vehicle 110 is able to travel to the target parking location (S330). When it is determined in S330 that the vehicle 110 is able to travel to the target parking location (Y), the vehicle 110 may create the travel path to the target parking location (S350). In addition, the vehicle 110 may be controlled to travel to the target parking location (S360).

When it is determined in S330 that the vehicle 110 is not able to travel to the target parking location, the vehicle 110 may request the server 120 for the new target parking location again (S340), and re-receive the new target parking location from the server to determine whether the vehicle 110 is able to travel to the new target parking location.

Figure 10:
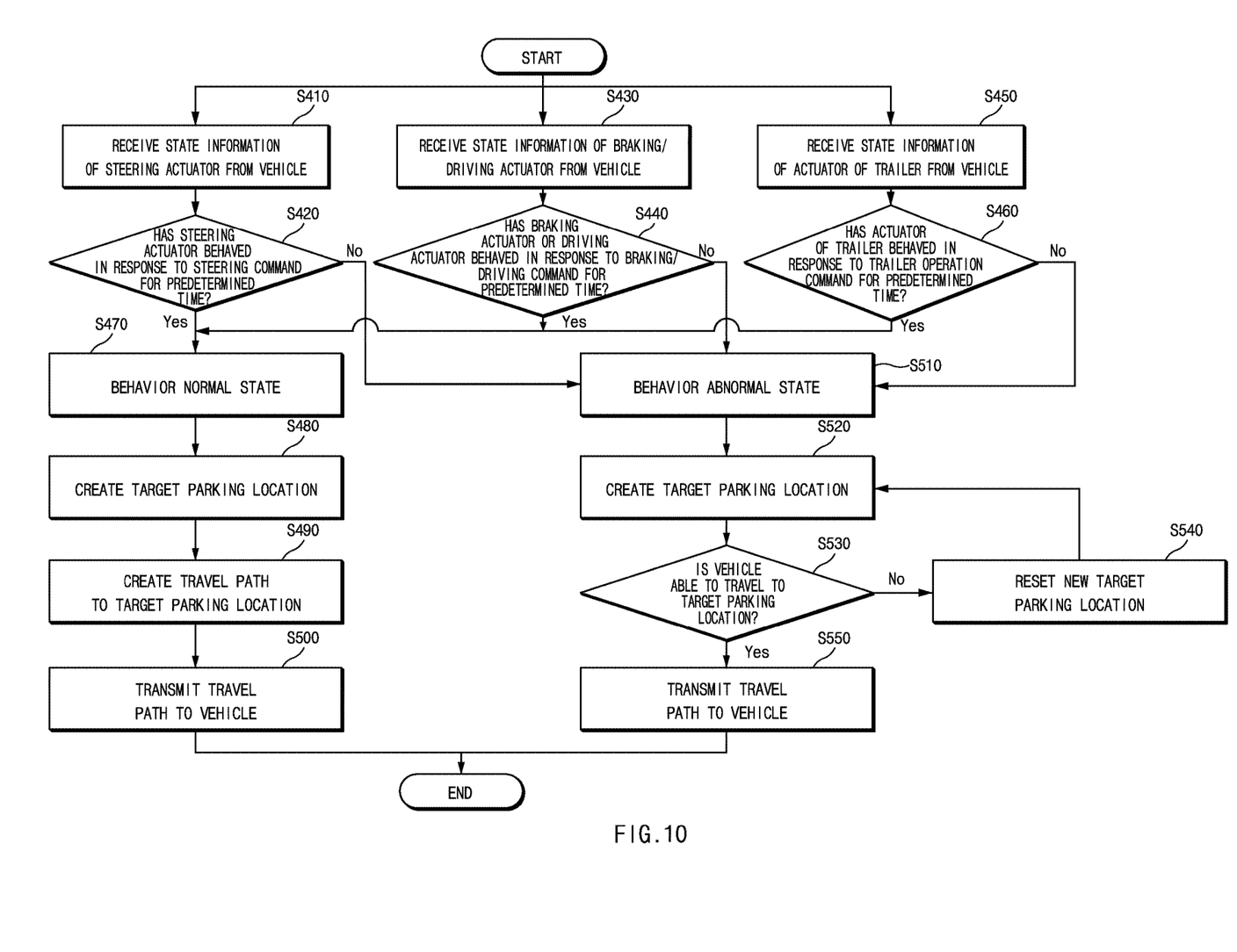
FIG. 10 is a flowchart illustrating a vehicle travel control method in one form of the present disclosure.

FIG. 10 is a flowchart illustrating a vehicle travel control method in some forms of the present disclosure.

As shown in FIG. 10, the server 120 in some forms of the present disclosure may receive the state information of the steering actuator from the vehicle 110 (S410), and determine whether the steering actuator has behaved in response to the steering command of the vehicle for the predetermined time (S420). In addition, the server 120 may receive the state information of the braking actuator or the driving actuator (S430), and determine whether the braking actuator or the driving actuator has behaved in response to the braking command or the driving command of the vehicle for the predetermined time (S440). In addition, the server 120 may receive the state information of the actuator of the trailer (S450), and determine whether the actuator of the trailer has behaved in response to the control command for the predetermined time (S460).

The server 120 may determine whether the behavior of the actuator is in the normal state based on the state of the actuator received in S420, S440, and S460.

When it is determined that the behavior of the actuator is in the normal state (S470), the server 120 may create the target parking location (S480), create the travel path to the target parking location (S490), and transmit the travel path to the target parking location to the vehicle 110 (S500).

In one example, when it is determined that the behavior of the actuator is in the abnormal state (S510), the server 120 may create the target parking location (S520), and determine whether the vehicle 110 is able to travel to the target parking location (S530). When it is determined in S530 that the vehicle 110 is able to travel to the target parking location (Y), the server 120 may create the travel path to the target parking location and transmit the travel path to the target parking location to the vehicle 110 (S550). When it is determined in S530 that the vehicle 110 is not able to travel to the target parking location (N), the server 120 may reset the new target parking location (S540). The server 120 may redetermine whether the vehicle is able to travel to the new target parking location, create the travel path to the new target parking location when it is determined that the vehicle 110 is able to travel to the new target parking location, and transmit the travel path to the target parking location to the vehicle 110.

Figure 11:
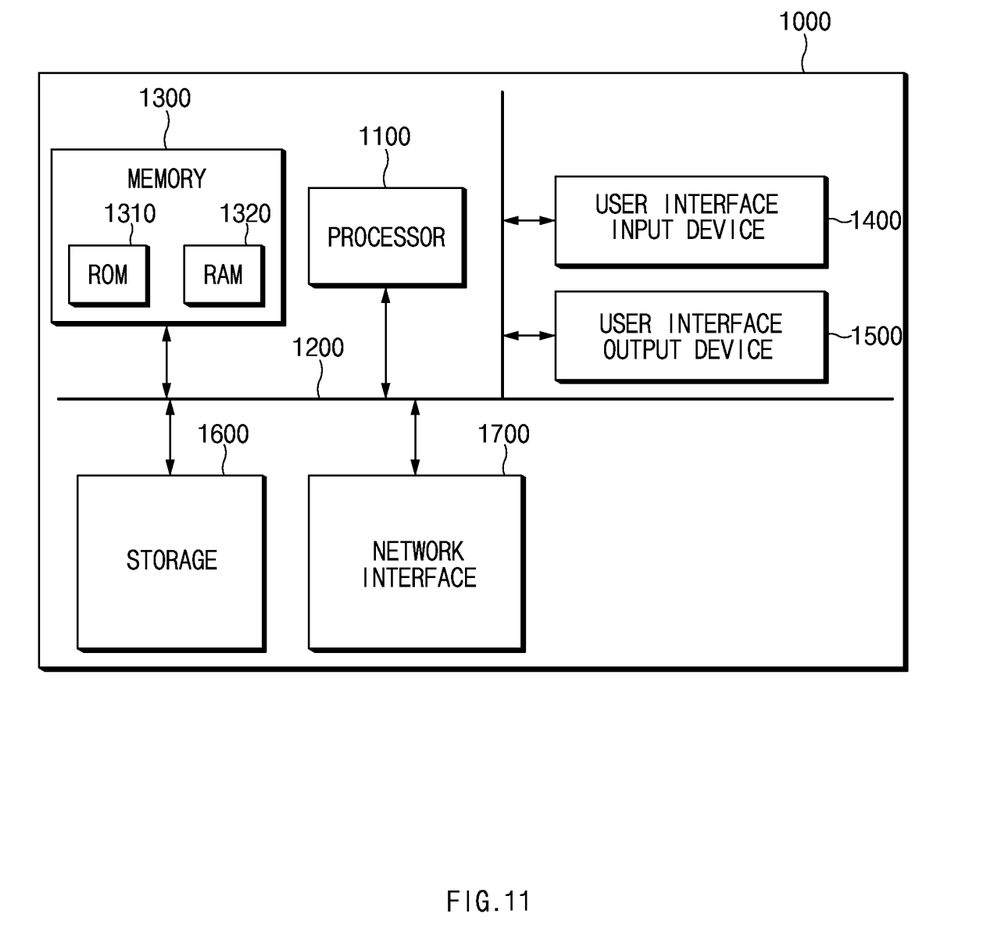
FIG. 11 illustrates a configuration of a computing system executing a method in one form of the present disclosure.

FIG. 11 illustrates a configuration of a computing system executing a method in some forms of the present disclosure.

With reference to FIG. 11, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in some forms of the present disclosure may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, some forms of the present disclosure are not intended to limit the technical idea of the present disclosure but to illustrate the present disclosure, and the scope of the technical idea of the present disclosure is not limited by the forms. The scope of the present disclosure should be construed as being covered by the scope of the appended claims, and all technical ideas falling within the scope of the claims should be construed as being included in the scope of the present disclosure.

The system and the method for controlling the travel of the vehicle in some forms of the present disclosure may support the parking based on the state information of the vehicle to which the trailer is connected, thereby providing a parking assistance service suitable for a large commercial vehicle. In addition, efficient space operation is possible by lowering a degree of congestion in a space where a number of vehicles enter and exit.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for controlling travel of a vehicle, the system comprising:
    a server configured to create a target parking spot; and the vehicle configured to:
        acquire state information of an actuator from a sensor;
        determine whether a behavior of the actuator is in a normal state based on the state information of the actuator;
        determine whether the vehicle is able to travel to the target parking spot when the behavior of the actuator is in an abnormal state; and
        request the server for a new target parking spot when based on the state information of the actuator, in which the behavior of the actuator is in the abnormal state, it is determined that the vehicle is not able to travel to the target parking spot.

2. The system of claim 1, wherein the vehicle is configured to:
    acquire at least one of state information of a steering actuator, state information of a braking actuator, state information of a driving actuator, or state information of an actuator of a trailer connected to the vehicle from the sensor.

3. The system of claim 1, wherein the vehicle is configured to:
    determine whether the actuator behaves in response to a control command of the vehicle for a predetermined amount of time based on the state information of the actuator; and
    determine whether the behavior of the actuator is in the normal state based on a determination result.

4. The system of claim 1, wherein the vehicle is configured to:
    predict the state information of the actuator based on a Kalman filter or a pre-learned result; and
    compare the predicted state information of the actuator with the state information of the actuator to determine whether the behavior is in the normal state.

5. The system of claim 2, wherein the server is configured to:
    create the target parking spot based on at least one of a maximum turning radius of the vehicle calculated based on the state information of the steering actuator of the vehicle, a travelable distance calculated based on the state information of the driving actuator or the state information of the braking actuator, or an available parking region determined based on the state information of the actuator of the trailer.

6. A system for controlling travel of a vehicle, the system comprising:

the vehicle configured to acquire state information of an actuator from a sensor; and a server configured to:
- create a target parking spot of the vehicle;
- determine whether a behavior of the actuator is in a normal state based on the state information;
- determine whether the vehicle is able to travel to the target parking spot when it is determined that the behavior of the actuator is in an abnormal state; and
- create a new target parking spot when based on the state information of the actuator, in which the behavior of the actuator is in the abnormal state, it is determined that the vehicle is not able to travel to the target parking spot.

7. The system of claim 6, wherein the server is configured to:
receive at least one of state information of a steering actuator, state information of a braking actuator, state information of a driving actuator, or state information of an actuator of a trailer connected to the vehicle from the vehicle.

8. The system of claim 6, wherein the server is configured to:
- determine whether the actuator behaves in response to a control command of the vehicle for a predetermined amount of time based on the state information of the actuator; and
- determine whether the behavior of the actuator is in the normal state based on a determination result.

9. The system of claim 6, wherein the server is configured to:
- predict the state information of the actuator based on a Kalman filter or a pre-learned result; and
- compare the predicted state information of the actuator with the state information of the actuator to determine whether the behavior is in the normal state.

10. The system of claim 7, wherein the server is configured to:
create the target parking spot based on at least one of a maximum turning radius of the vehicle calculated based on the state information of the steering actuator of the vehicle, a travelable distance calculated based on the state information of the driving actuator or the state information of the braking actuator, or an available parking region determined based on the state information of the actuator of the trailer.

11. A method for controlling travel of a vehicle, the method comprising:

acquiring state information of an actuator from a sensor of the vehicle;

determining whether a behavior of the actuator is in a normal state based on the state information of the actuator;

receiving a target parking spot from a server;

determining whether the vehicle is able to travel to the target parking spot when it is determined that the behavior of the actuator is in an abnormal state; and requesting the server for a new target parking spot when based on the state information of the actuator, in which the behavior of the actuator is in the abnormal state, it is determined that the vehicle is not able to travel to the target parking spot.

12. The method of claim 11, wherein the acquiring of the state information of the actuator includes:
acquiring at least one of state information of a steering actuator, state information of a braking actuator, state information of a driving actuator, or state information of an actuator of a trailer connected to the vehicle from the sensor.

13. The method of claim 11, wherein the determining of whether the behavior of the actuator is in the normal state includes:
- determining whether the actuator behaves in response to a control command of the vehicle for a predetermined amount of time based on the state information of the actuator; and
- determining whether the behavior of the actuator is in the normal state based on a determination result.

14. The method of claim 11, wherein the determining of whether the behavior of the actuator is in the normal state includes:
- predicting the state information of the actuator based on a Kalman filter or a pre-learned result; and
- comparing the predicted state information of the actuator with the state information of the actuator to determine whether the behavior is in the normal state.

15. The method of claim 12, further comprising:
creating, by the server, the target parking spot based on at least one of a maximum turning radius of the vehicle calculated based on the state information of the steering actuator of the vehicle, a travelable distance calculated based on the state information of the driving actuator or the state information of the braking actuator, or an available parking region determined based on the state information of the actuator of the trailer.

\* \* \* \* \*